G. E. RIGBY.
FRAME OF MOTORCYCLES.
APPLICATION FILED JUNE 2, 1919.
1,395,358.
Patented Nov. 1, 1921.
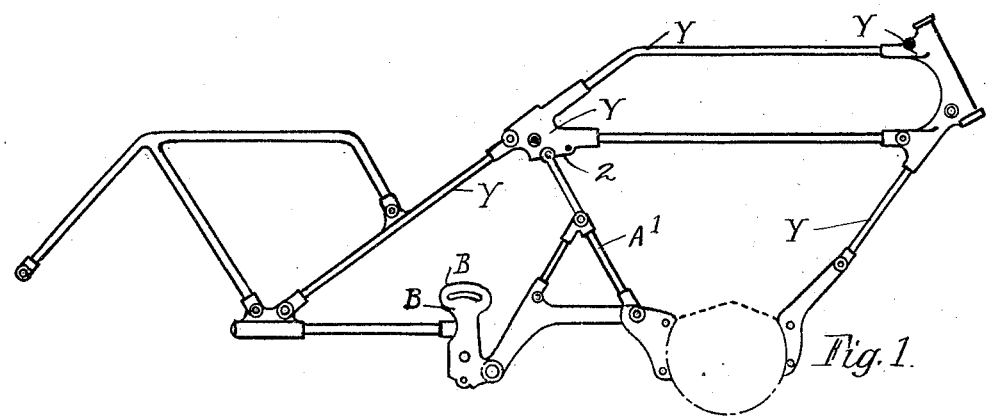
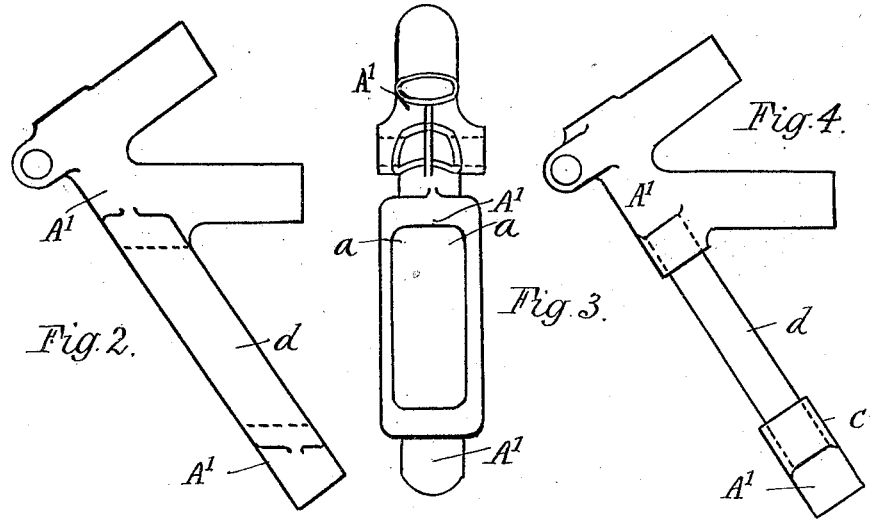
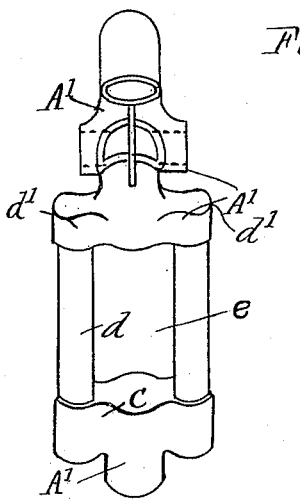
Witnesses:-
Edward Maw
John Smith
INVENTOR:-
George Edwin Rigby,
By: J. Chatwin
ATTY.

UNITED STATES PATENT OFFICE.

GEORGE EDWIN RIGBY, OF MANCHESTER, ENGLAND.

FRAME OF MOTORCYCLES.

1,395,358.  Specification of Letters Patent.  Patented Nov. 1, 1921.

Original application filed June 11, 1918, Serial No. 239,365. Divided and this application filed June 2, 1919. Serial No. 301,290.

*To all whom it may concern:*

Be it known that I, GEORGE EDWIN RIGBY, of Manchester, England, a subject of the King of England, residing at London, in the Kingdom of England, have invented new and useful Improvements in the Frames of Motorcycles, of which the following is a specification.

This invention relates to the frames of motorcycles, of the kind fitted with a short seat tube and with anti-vibration means in connection with the rear wheel, and it relates more particularly to improvements in the construction of the main frame or middle section which is adapted to carry the engine, gear box, stand and mudguard and to receive independent spring controlled front and rear forks. In my specification Serial No. 239365 June 11, 1918, of which the present application is a division I have referred to a laminated spring or springs disposed at or near the center to take up the vibrations of the rear road wheel. Such a frame as that hereinafter described is of great advantage in conjunction with such laminated or leaf springs for example, as the spring or springs can then pass centrally from a point behind to a point forward of the seat tube near to the seat pillar. The said middle section is provided with lugs, or side plates to carry an independent spring controlled rear fork, stand, mudguard and carrier.

In order that the invention may be clearly understood and readily carried into effect, I will describe the same fully with reference to the accompanying drawings, in which:—

Figure 1 is a general view of a frame according to this invention; Fig. 2 shows a side view of a modified form; Fig. 3 shows a corresponding rear view; and Figs. 4 and 5 show side and rear views respectively of a further construction.

In these drawings, B and Y represent that part of the frame of a motorcycle known as the middle section or main frame; the seat tube $A^1$ is cut away beneath the seat lug as shown at 2 in Fig. 1, or an enlarged cross-section at the upper portion of the seat tube is formed with an aperture $a$ as shown in Figs. 2 and 3, or again I may provide the end of the lower part of the seat tube with a lug $c$ to receive arms $d$ connected together at their upper ends by a similar lug $d^1$ forming the seat lug or being connected therewith, as shown in Figs. 4 and 5, likewise leaving an opening such as $e$, close underneath the seat.

It will thus be obvious that a laminated spring can pass through the laterally spaced connecting means between the seat lug and the seat tube, or through apertures $a$ or $e$ and be suitably connected to the frame in a central position near and practically parallel with the seat.

In the case of Fig. 1, the seat tube $A^1$ may be connected with the lug 2 by side plates, in any convenient manner to leave a space between such plates or fittings for a laminated or leaf spring to pass therethrough from a point rearward to a point forward of said tube and near the seat.

I am aware that a duplex motorcycle frame has been constructed in which a double seat pillar member is used with a space between the bars thereof, and I am also aware that a seat pillar member has been formed at its upper end with an off-set or cranked portion to enable articles to pass from behind to in front of the member in the plane of the machine.

I do not claim such features broadly but what I claim is:—

A frame for motorcycles having a rigid middle section or main frame and an articulated rear frame for the rear road-wheel, in combination with a shortened seat lug, a lower seat tube member, and laterally spaced connecting means between said lug and seat tube.

GEORGE EDWIN RIGBY.